July 3, 1956  K. J. AVERSTEN  2,753,426
POROUS SHIELDING BODY TO BE USED WHILE FASTENING
PINS, STUDS AND THE LIKE BY MEANS OF ARC WELDING
OR SOLDERING AND METHOD FOR PRODUCING SAME
Filed March 3, 1954

INVENTOR
KARL J. AVERSTEN,

BY Lanoy and Taylor
ATTORNEYS

United States Patent Office 2,753,426
Patented July 3, 1956

2,753,426

POROUS SHIELDING BODY TO BE USED WHILE FASTENING PINS, STUDS AND THE LIKE BY MEANS OF ARC WELDING OR SOLDERING AND METHOD FOR PRODUCING SAME

Karl J. Aversten, Lidingo, Sweden, assignor to Svenska Aktiebolaget Gasaccumulator, Lidingo (near Stockholm), Sweden, a corporation of Sweden Application March 3, 1954, Serial No. 413,912

Claims priority, application Sweden March 14, 1953

4 Claims. (Cl. 219—8)

The present invention refers to a shielding body to be used at the end of pins, studs and the like while this end is being fastened to a surface by means of arc welding or soldering. For this purpose it is previously known to use a ventilated porcelain ring, enclosing the gases around the arc and the fusion and preventing air admission to the welding point and simultaneously letting out the surplus gas occurring at the welding point. According to the present invention the shielding body is intended to serve not only as a suitable protection against gas admission at the welding point but also as a flux for the fusion. This is obtained thereby that, according to the invention, the shielding body consists of glass fibres which do not prevent the surplus gas from leaving and which after melting in the fusion have a fluxing or cleaning effect on it, so that good welding or soldering is obtained.

Figures 1, 2:
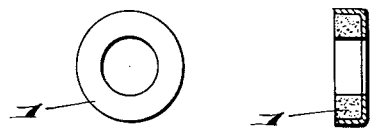
Figure 3:
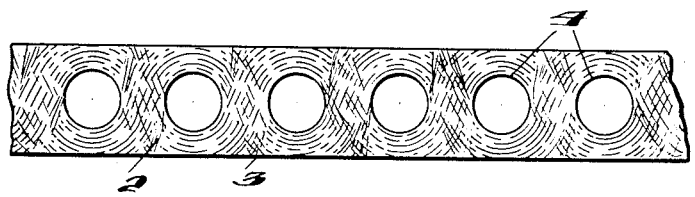
Figure 4:
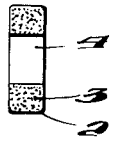
Figure 5:
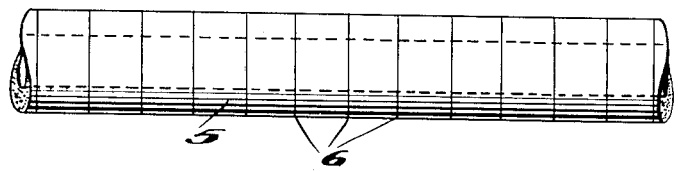

The invention will be further described in connection with the description of some ways of execution, shown in the attached drawing. Fig. 1 shows a view of a shielding body according to the invention. Fig. 2 shows a section through the body in Fig. 1. Fig. 3 shows a longitudinal section of the shielding body in the form of a band. Fig. 4 shows a cross section of the body in Fig. 3. Fig. 5 shows a view of the shielding body in the form of a tube.

According to the embodiment shown in Figs. 1 and 2, the shielding body consists of a ring 1 of glass fibres, so-called glass wool or rock wool, preferably composed of alkaline earth metal combinations, such as alkaline earth metal silicates including magnesium silicate, possibly with addition of alkaline earth metal halides and/or aluminium combinations.

This ring 1 may be produced by winding glass fibres directly around the end of the pin or stud whch is to be welded or soldered on to a surface, or else glass fibres are by means of some paste wound around a mandrel or on a ring-formed core in order to form such a separately usable ring 1.

According to the embodiment shown in Figs. 3 and 4, the shielding body has the form of a band, consisting of glass fibres 2, loosely put into a paper cover 3, which is impregnated, for instance with water glass, in order not to be combustible. Right through the band there are pressed holes 4 and through each of these is inserted the stud or the like, for which the band 2, 3 is to form a shielding body. The distance between the holes 4 is suitably the same as the distance shall be between the welded studs mutually, but if this is not the case, the band 2, 3 is cut off, so that the holes 4 may be put at the right place. The cover 3 must not necessarily completely enclose the glass fibres, because these may be sewn on to one side of a cover strip, or else the cover may be left out, as the glass fibres 2 may be woven, plaited, spun or the like in order to form a band.

According to the embodiment shown in Fig. 5, the glass fibres are so applied that they form a tube 5 which is then cut up into sections, indicated by thin lines 6, so that rings are obtained. The fibres may be kept together by means of an outer and/or inner cover, pasting or warm pressing.

A shielding body of any of the described forms is applied around a stud end and when this is melted in the arc, the adjacent glass fibres are melted and will flux or clean the fusion and form a protecting coat thereon at the same time as the remaining, unmelted fibres around the stud end are forming a shield for the gases round the arc and the welding point, keeping out the air but letting through surplus gas at the welding point.

What is claimed is:

1. A porous shielding body for arc welding with studs and the like, comprising a glass fibre body having a central opening, said opening being larger than the stud with which said body is to be used whereby said glass fibre is adapted to form a shield in arc welding.

2. A porous shielding body as recited in claim 1 including a non-combustible cover.

3. A shielding body for use in arc welding studs to plates and the like comprising a porous glass fibre body having a central opening, said central opening being sufficiently large to receive the stud, said body adapted to be placed against the plate and to receive the stud whereby said body forms a shield during the arc welding operation.

4. A strip for supplying porous shielding bodies for use in arc welding studs to plates and the like comprising an elongated band of glass fiber material, said band having a plurality of spaced apertures therein, each said aperture being of a diameter sufficiently large to receive a stud, said strip adapted to be placed against the plate whereby the glass fiber material provides a shield during the arc welding operation and permits the escape of hot gases.

References Cited in the file of this patent

UNITED STATES PATENTS

| Number | Name | Date |
|---|---|---|
| 165,246 | Miles | July 6, 1875 |
| 720,300 | Vervaet | Feb. 10, 1903 |
| 1,341,647 | Jones | June 1, 1920 |
| 1,741,031 | Miller | Dec. 24, 1929 |
| 2,384,403 | Somers | Sept. 4, 1945 |